(12) United States Patent
Lee

(10) Patent No.: US 7,782,608 B2
(45) Date of Patent: Aug. 24, 2010

(54) DOCKING SYSTEM AND PORTABLE COMPUTER HAVING THE SAME

(75) Inventor: Kwang-su Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 282 days.

(21) Appl. No.: 11/843,110

(22) Filed: Aug. 22, 2007

(65) Prior Publication Data

US 2008/0189463 A1 Aug. 7, 2008

(30) Foreign Application Priority Data

Feb. 2, 2007 (KR) .................. 10-2007-0011207

(51) Int. Cl.
*G06F 1/16* (2006.01)

(52) U.S. Cl. .................. 361/679.44; 361/679.41

(58) Field of Classification Search .. 361/679.4–679.45
See application file for complete search history.

(56) References Cited

U.S. PATENT DOCUMENTS

| | | | | |
|---|---|---|---|---|
| 5,182,698 A * | 1/1993 | Kobayashi et al. | ..... | 361/679.43 |
| 5,290,178 A * | 3/1994 | Ma | ........ | 361/679.41 |
| 5,313,596 A * | 5/1994 | Swindler et al. | ............. | 710/303 |
| 5,535,093 A * | 7/1996 | Noguchi et al. | ......... | 361/679.43 |
| 5,552,959 A * | 9/1996 | Penniman et al. | ...... | 361/679.41 |
| 5,737,541 A * | 4/1998 | Shimizu et al. | ............. | 710/303 |
| 5,790,375 A * | 8/1998 | Lee | ........ | 361/679.43 |
| 5,882,220 A * | 3/1999 | Horii et al. | ............. | 361/679.41 |
| 5,933,321 A * | 8/1999 | Ruch et al. | ............. | 361/679.42 |
| 6,072,695 A * | 6/2000 | Steiger et al. | .......... | 361/679.41 |
| 6,353,535 B1 * | 3/2002 | Yoshida | .................. | 361/679.41 |
| 6,366,450 B1 * | 4/2002 | Janicek | .................... | 361/679.41 |
| 6,683,786 B2 * | 1/2004 | Yin et al. | .................. | 361/679.4 |
| 6,833,988 B2 * | 12/2004 | Kamphuis et al. | ...... | 361/679.41 |
| 6,952,343 B2 * | 10/2005 | Sato | ........ | 361/679.57 |
| 7,381,079 B2 * | 6/2008 | Chuang | ................ | 361/679.41 |
| 2004/0052036 A1 * | 3/2004 | DeLuga | ...................... | 361/679 |
| 2007/0041156 A1 * | 2/2007 | Chang et al. | ................ | 361/686 |

FOREIGN PATENT DOCUMENTS

| | | |
|---|---|---|
| JP | 2001-154755 | 6/2001 |
| KR | 1999-35733 | 9/1999 |
| KR | 2002-67381 | 8/2002 |
| KR | 2005-5362 | 1/2005 |

* cited by examiner

*Primary Examiner*—Lisa Lea-Edmonds
(74) *Attorney, Agent, or Firm*—Stanzione & Kim, LLP

(57) ABSTRACT

A docking system which is detachably coupled with a computer main body, includes a docking main body which is formed with a docking opening, a docking bracket including a docking part which is accommodated to the docking opening to be electrically connected with the computer main body, and a position moving unit which couples the docking main body and the docking bracket to move the docking bracket relative to the docking main body.

22 Claims, 14 Drawing Sheets

DOCKING SYSTEM AND PORTABLE COMPUTER HAVING THE SAME

CROSS-REFERENCE TO RELATED APPLICATIONS

This application claims priority from Korean Patent Application No. 10-2007-0011207, filed on Feb. 2, 2007 in the Korean Intellectual Property Office, the disclosure of which is incorporated herein by reference in its entirety.

BACKGROUND OF THE INVENTION

1. Field of the Invention

A docking system and a portable computer having the same consistent with the present general inventive concept relate to improving a docking configuration of a portable computer.

2. Description of the Related Art

In general, a portable computer includes a display part mounted with a liquid crystal display (LCD) panel, and a computer main body supporting the display part and mounted with various hardware. Also, recently, a docking system, detachably mounted to the computer main body, has been used so that the portable computer can have various functions like a desktop computer.

The docking system includes a hardware frame and a series of electrical connection interfaces enabling the portable computer to efficiently function like a desktop computer. In general, the interfaces enable the computer main body to communicate with a peripheral device such as an auxiliary memory device, e.g., a CD-ROM drive or a backup drive, or a local printer mounted to the docking system.

However, conventionally, since the configuration of the docking system varies according to the type and size of the computer main body, it is difficult to use a docking system with different types of portable computers. Accordingly, it is preferable to provide a docking system to be capable of use with various computer main bodies.

SUMMARY OF THE INVENTION

The present general inventive concept provides a docking system and a portable computer having the same being capable of use with various types of computer bodies.

The present general inventive concept also provides a docking system and a portable computer having the same relieving a design restriction with respect to the position of a main body connector of a computer main body.

Additional aspects and utilities of the present general inventive concept will be set forth in part in the description which follows and, in part, will be obvious from the description, or may be learned by practice of the present general inventive concept.

The foregoing and/or other aspects and utilities of the present general inventive concept can be achieved by providing a docking system which is detachably coupled with a computer main body, comprising a docking main body which is formed with a docking opening, a docking bracket which comprises a docking part which is accommodated to the docking opening to be electrically connected with the computer main body, and a position moving unit which couples the docking main body and the docking bracket to relatively move the docking bracket with respect to the docking main body.

The position moving unit may comprise a transverse moving part which is coupled to one of the docking main body and the docking bracket to move the docking bracket in a transverse direction with respect to a surface of the docking main body.

The position moving unit may further comprise a perpendicular moving part which is coupled to the transverse moving part to move the docking bracket in a perpendicular direction different from the transverse direction with respect to the surface of the docking main body.

The transverse direction and the perpendicular direction may be substantially perpendicular each other.

The transverse moving part may comprise at least one of a transverse transmitting member which transmits a force, which moves the transverse moving part with respect to the docking main body, to the perpendicular moving part, and a transverse guiding member which guides the transverse moving part with respect to the docking main body.

The transverse transmitting member may comprise a transverse rack which is provided to one of the docking bracket and the perpendicular moving part, and a transverse pinion which is provided to the other of the docking bracket and the perpendicular moving part to be engaged with the transverse rack.

The transverse guiding member may comprise a transverse guiding slot which is provided to one of the docking bracket and the perpendicular moving part, and a transverse guiding protrusion which is provided to the other of the docking bracket and the perpendicular moving part to be engaged with the transverse guiding slot.

The perpendicular moving part may comprise a perpendicular moving member which is interposed between the docking main body and the docking bracket to be coupled with the transverse moving part.

The perpendicular moving part may further comprise at least one of a perpendicular transmitting member which transmits a force, which moves the docking bracket with respect to the docking main body, to the docking main body, and a perpendicular guiding member which guides the docking bracket with respect to the transverse moving part.

The perpendicular transmitting member may comprise a perpendicular rack which is provided to one of the docking main body and the perpendicular moving part, and a perpendicular pinion which is provided to the other of the docking main body and the perpendicular moving part to be engaged with the perpendicular rack.

The perpendicular guiding member may comprise a perpendicular guiding slot which is provided to one of the docking main body and the perpendicular moving part, and a perpendicular guiding protrusion which is provided to the other of the docking main body and the perpendicular moving part to be engaged with the perpendicular guiding slot.

The position moving unit may further comprise a moving restricting part which restricts a relative movement of the docking bracket when relatively moving the docking bracket with respect to the docking main body.

The transverse moving part may comprise a transverse guiding bar which is coupled to one of the docking bracket and the perpendicular moving part, and a transverse guiding holder which is coupled to the other of the docking bracket and the perpendicular moving part to be engaged with the transverse guiding bar.

The perpendicular moving part may comprise a perpendicular guiding bar which is provided to one of the docking main body and the transverse moving part, and a perpendicular guiding holder which is provided to the other of the docking main body and the transverse moving part to be coupled with the perpendicular guiding bar.

The foregoing and/or other aspects and utilities of the present general inventive concept can also be achieved by providing a portable computer, comprising a computer main body, and a docking system which is detachably coupled with the computer main body, the docking system comprising a docking main body which is formed with a docking opening, a docking bracket which comprises a docking part which is accommodated to the docking opening to be electrically connected with the computer main body, and a position moving unit which couples the docking main body and the docking bracket to relatively move the docking bracket with respect to the docking main body.

The position moving unit may comprise a transverse moving part which is coupled to one of the docking main body and the docking bracket to move the docking bracket in a transverse direction with respect to the docking main body.

The position moving unit may further comprise a perpendicular moving part which is coupled to the transverse moving part to move the docking bracket in a perpendicular direction different from the transverse direction with respect to the docking main body. The transverse direction and the perpendicular direction may be substantially perpendicular each other.

The foregoing and/or other aspects and utilities of the present inventive concept may also be achieved by providing a docking station for coupling with a portable computer, comprising a main housing having an opening therein, a plate positioned to cover the opening, an electrical connector mounted on the plate to have a fixed positional relationship with the plate, a physical connector to movably connect the plate to the main housing, wherein the position of the electrical connector relative to the main housing is adjustable.

The foregoing and/or other aspects and utilities of the present inventive concept may also be achieved by providing a method of connecting a portable computer to a docking station, comprising adjusting the position of a movable electrical connector movably mounted to the docking station relative to the periphery of the docking station and mating the electrical connector of the docking station to an electrical connector of the portable computer.

The foregoing and/or other aspects and utilities of the present general inventive concept can also be achieved by providing a docking station to couple with a portable computer, comprising: a main housing having an opening therein; a plate positioned to cover the opening; an electrical connector mounted on the plate to have a fixed positional relationship with the plate; and a physical connector to movably connect the plate to the main housing, wherein the position of the electrical connector relative to the main housing is adjustable.

BRIEF DESCRIPTION OF THE DRAWINGS

These and/or other aspects of the present general invention concept will become apparent and more readily appreciated from the following description of the exemplary embodiments, taken in conjunction with the accompanying drawings, in which.

DETAILED DESCRIPTION OF THE PREFERRED EMBODIMENTS

Figure 1:
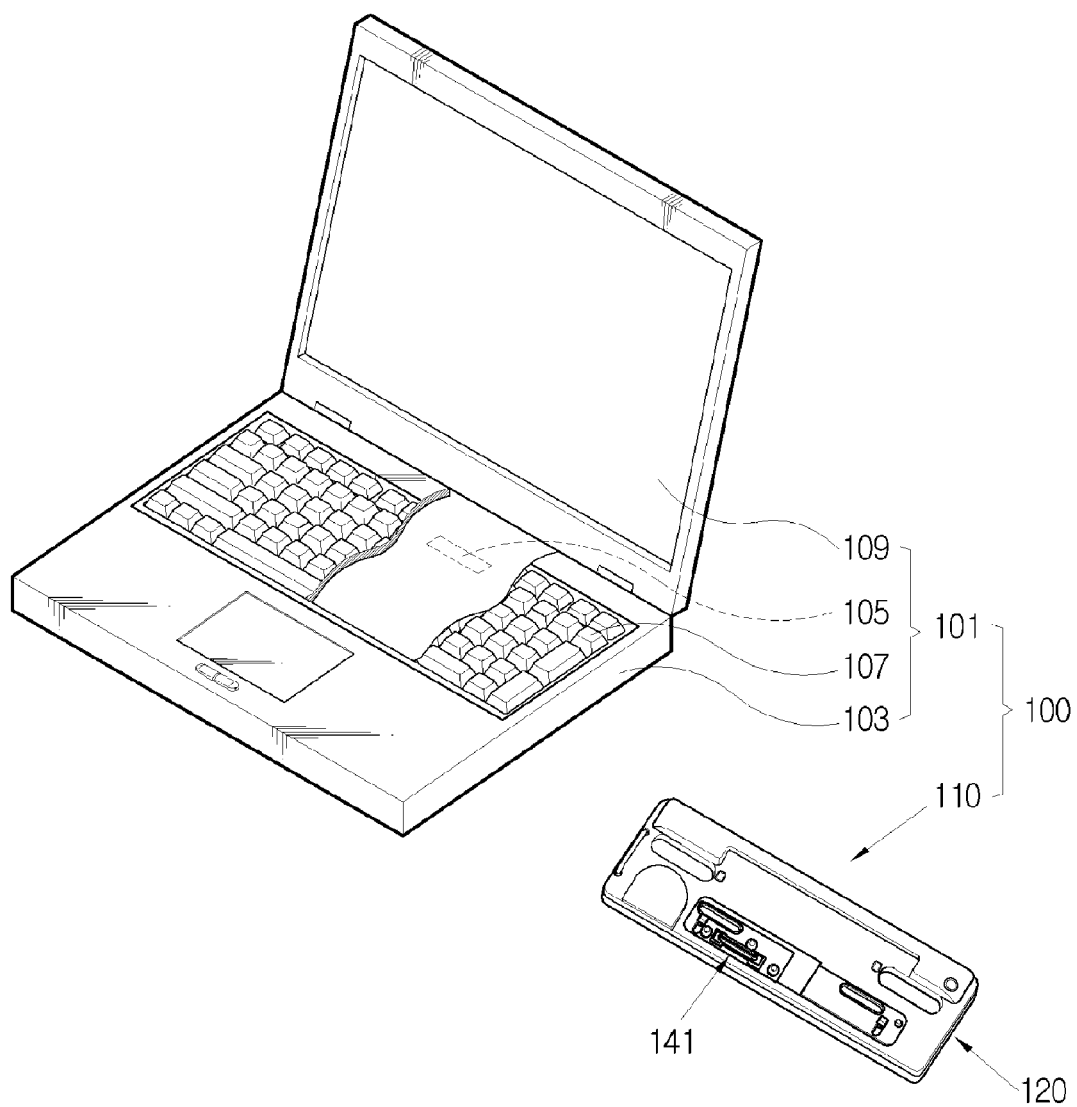
FIG. 1 is a perspective view illustrating a portable computer according to an exemplary embodiment.
Figure 2:
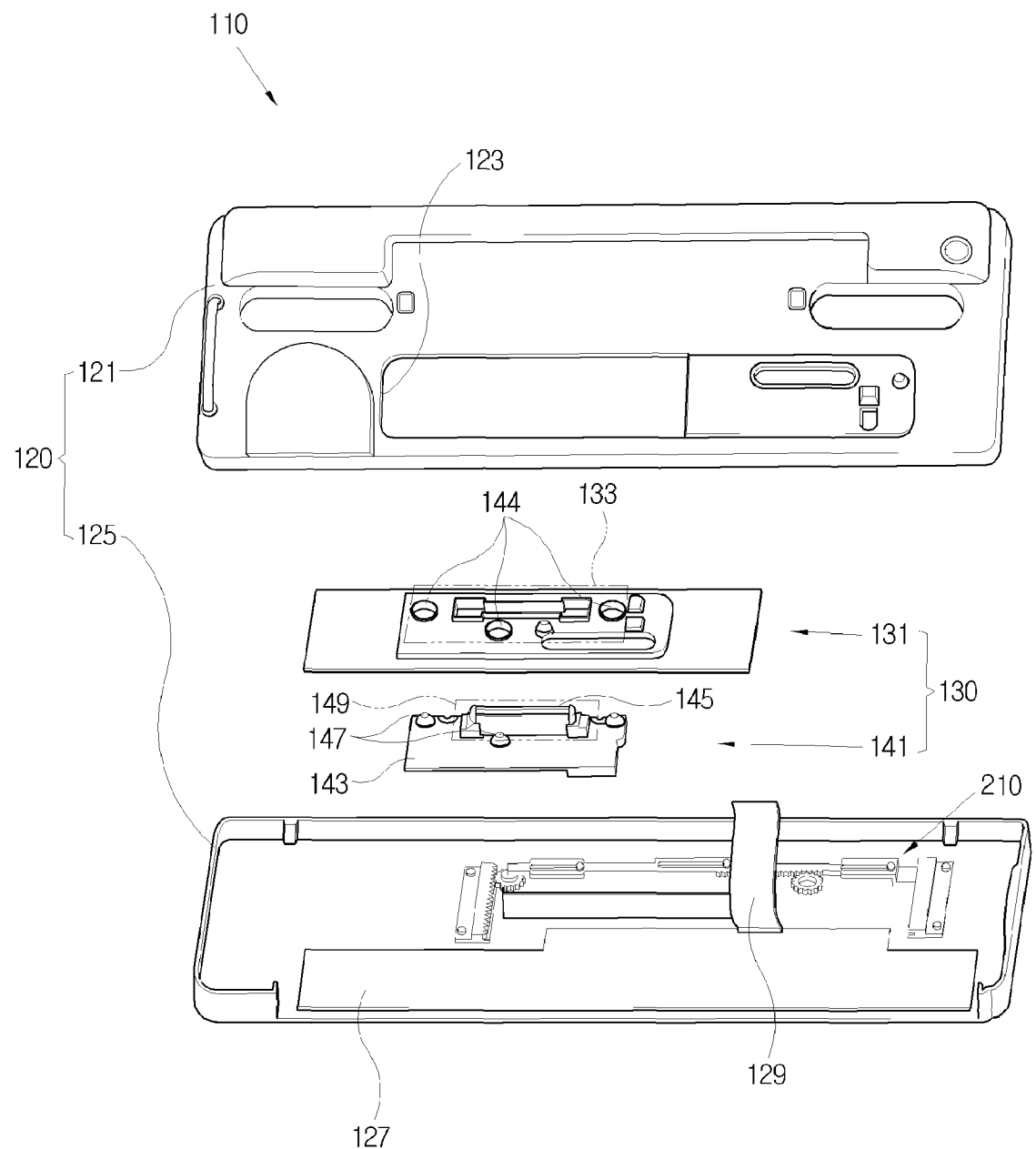
FIG. 2 is an exploded perspective view illustrating a docking unit according to the exemplary embodiment in FIG. 1.

Reference will now be made in detail to the embodiments of the present general inventive concept, examples of which are illustrated in the accompanying drawings, wherein like reference numerals refer to like elements throughout. The exemplary embodiments are described below so as to explain the present general inventive concept by referring to the figures.

Hereinafter, for simplicity of the description, the direction left to right and right to left in FIGS. 2-11 will be referred to as a "transverse direction". This direction is denoted in FIGS. 3 and 4A with an arrow labeled with 'X'. The direction up to down and down to up in FIGS. 2-11 will be referred to as a "perpendicular direction." This perpendicular is denoted in FIGS. 3 and 4A with an arrow labeled as 'Y'. As noted, these terms are used for ease of description only, and the transverse direction and the perpendicular direction may be switched.

As illustrated in FIGS. 1 to 6B, a portable computer 100 according to an exemplary embodiment includes a computer main body 101, and a docking system 110. The computer main body 101 of the portable computer 100 may be of various types, sizes and shapes.

The computer main body 101 includes a main body casing 103 forming an external appearance, and a keyboard 107 and a touch pad (not shown) provided on an upper side of the main body casing 103 for input of data, etc.

A main body connector 105 is provided on the rear of the main body casing 103 of the computer main body 101 to be coupled with a docking connector 145 of a docking part 141 of the docking system 110. A hook coupling part (not shown) may be provided on the computer main body 101 to couple and detach the docking system 110.

The computer main body 101 further includes a display 109 rotatably coupled with the main body casing 103, and electrically connected to the main body casing 103, to display an image.

Accordingly, the main body connector 105 may be coupled with the docking part 141 of the docking system 110 to transmit and receive power and data to and from the docking system 110.

The docking system 110 may transmit and receive power and data to and from the computer main body 101. The docking system 110 includes a docking main body 120, a docking bracket 130 and a position moving unit 210.

The docking main body 120 is coupled to the docking bracket 130 and the position moving unit 210. The docking main body 120 forms an outer shell of the docking system 110. The docking main body 120 includes a docking opening 123 through which the docking connector 145 protrudes. The front cover 121 and the rear cover 125 of the docking main body 120 are substantially planar, and are coupled together to form the outer shell of the docking system 110.

The docking main body 120 is coupled with an external cable (not shown) to transmit and receive power and various data to and from its exterior. The docking main body 120 includes a docking driving part 127 transmitting and receiving power, data, etc. to and from the external cable and/or the computer main body 101.

Also, the docking main body 120 includes a flexible substrate 129 electrically connecting the docking driving part 127 and the docking part 141. Here, the flexible substrate 129 electrically connects the docking part 141, which is moveable with respect to the docking main body 120, with the docking driving part 127. Here the docking driving part 127 is coupled to the rear cover 125, but may instead be coupled to the front cover 121. Accordingly, the flexible substrate 129 may include structure such as a flexible printed circuit board having a sufficient flexibility.

The docking driving part 127 according to this exemplary embodiment includes a hard disk drive. Alternatively, the docking driving part 127 may include a disk drive of other types such as a CD-ROM drive or a floppy disk drive storing data in a removable disk.

The docking bracket 130 is movable with respect to the docking main body 120. The docking bracket 130 includes a bracket main body 131 positioned within to close the docking opening 123. The bracket main body 131 is coupled with the position moving unit 210. The docking part 141 is both physically and electrically connected to the bracket main body 131.

The bracket main body 131 has a substantially planar shape, and may move relative to the front cover 121 in response to the position moving unit 210. The bracket main body 131 has a size to close the docking opening 123 for all positions where the bracket main body 131 moves relative to the front cover 121. The bracket main body 131 includes a docking accommodating groove 133 recessed from the surface facing the rear cover in a central area thereof by means of bending, etc. to receive the docking part 141. The bracket main body 131 is coupled with a transverse moving part, discussed below.

The docking part 141 includes a docking part main body 143 coupled with the docking accommodating groove 133 of the bracket main body 131, the docking connector 145 electrically connectable with the main body connector 105, and an electromagnetic interference EMI coupling member 147 to contact the computer main body 101 to prevent EMI and noise generated via the coupling with the computer main body 101. The docking part 141 further includes a sub substrate 149 connecting the docking connector 145 and the flexible substrate 129.

The bracket main body 131 has a planar shape, and includes docking accommodating openings 144, accommodating the docking connector 145 and the EMI coupling member 147.

Here, the bracket main body 131 and the docking part 141 are separately provided. Alternatively, the docking part main 141 and the bracket main body 131 may be integrally provided.

The docking connector 145 may be coupled with the main body connector 105 to be connected with a main body driving part (not shown) of the computer main body 101, and transmits and receives power, data, etc. between the computer main body 101 and the docking system 110. The docking connector 145 may employ various known interface types. The docking connector 145 is accommodated within the docking accommodating openings 144 of the docking part main body 143.

To assist with the discussion, note that in this example:
a transverse moving part includes a transverse transmitting member and a transverse guiding member;

the transverse transmitting member includes transverse rack 231, transverse pinion 233 with transverse pinion pivot 235;

the transverse guiding member includes transverse guiding slot 241, transverse guiding protrusion 245 with stopper 247; and a perpendicular moving part includes moving member 251, perpendicular transmitting member 260 and perpendicular guiding member 270.

The position moving unit 210 is coupled to the docking bracket 130 and the docking main body 120 to move the docking bracket 130 relative to the docking main body 120. The position moving unit 210 includes the transverse moving part to move the docking bracket 130 with respect to a surface of the docking main body 120 in a transverse direction, and a perpendicular moving part to move the docking bracket 130 in a plane parallel to the surface of the docking main body 120 in a perpendicular direction. Here, the position moving unit 210 has a configuration enabling the perpendicular moving part to concurrently move in the perpendicular direction while the transverse moving part moves in the transverse direction.

Also, the transverse moving part and the perpendicular moving part may coordinate to move the docking bracket 130 in a direction inclined with respect to the directions 'X' and 'Y' illustrated in FIG. 1.

Accordingly, the docking system 110 can simply couple and detach to and from computer main bodies 101 having various sizes and shapes. Also, standardization, etc. of the docking system 110 can be simply accomplished. Also, when designing, restrictions are relaxed regarding the position of the main body connector 105 relative to the computer main body 101.

The transverse moving part is coupled to the docking bracket 130 to move the docking bracket 130 with respect to the docking main body 120 in the transverse direction. In this example, the transverse moving part includes a transverse transmitting member and a transverse guiding member. However, alternative structures are also contemplated, such as a transverse moving part including only the transverse transmitting member, or only the transverse guiding member.

Alternatively, the transverse moving part may be directly coupled to the docking main body 120, unlike the above exemplary embodiment. In this alternative embodiment, the perpendicular moving part may be directly coupled with the docking bracket 130.

The transverse transmitting member includes a transverse rack 231 provided to a perpendicular moving member 251, and a transverse pinion 233 coupled to the docking bracket 130 with a fixed positional relationship and engaged with the transverse rack 231. Alternatively, the transverse rack 231 may coupled to have a fixed positional relationship with the docking bracket 130, and the transverse pinion 233 may be coupled to have a fixed positional relationship with the perpendicular moving member 251. Here, the transverse rack 231 is formed integral with the perpendicular moving member 251. Alternatively, the transverse rack 231 may be separately provided and coupled to the perpendicular moving member 251.

The transverse pinion 233 is coupled to the docking bracket 130 to be rotated about a transverse pinion pivot 235.

The transverse guiding member guides the docking bracket 130 in the transverse direction to move the docking main body 120. The transverse guiding member includes a transverse guiding slot 241 formed to the perpendicular moving member 251, and a transverse guiding protrusion 245 coupled to a surface of the docking bracket 130 to be guided by the transverse guiding slot 241.

Figure 3:
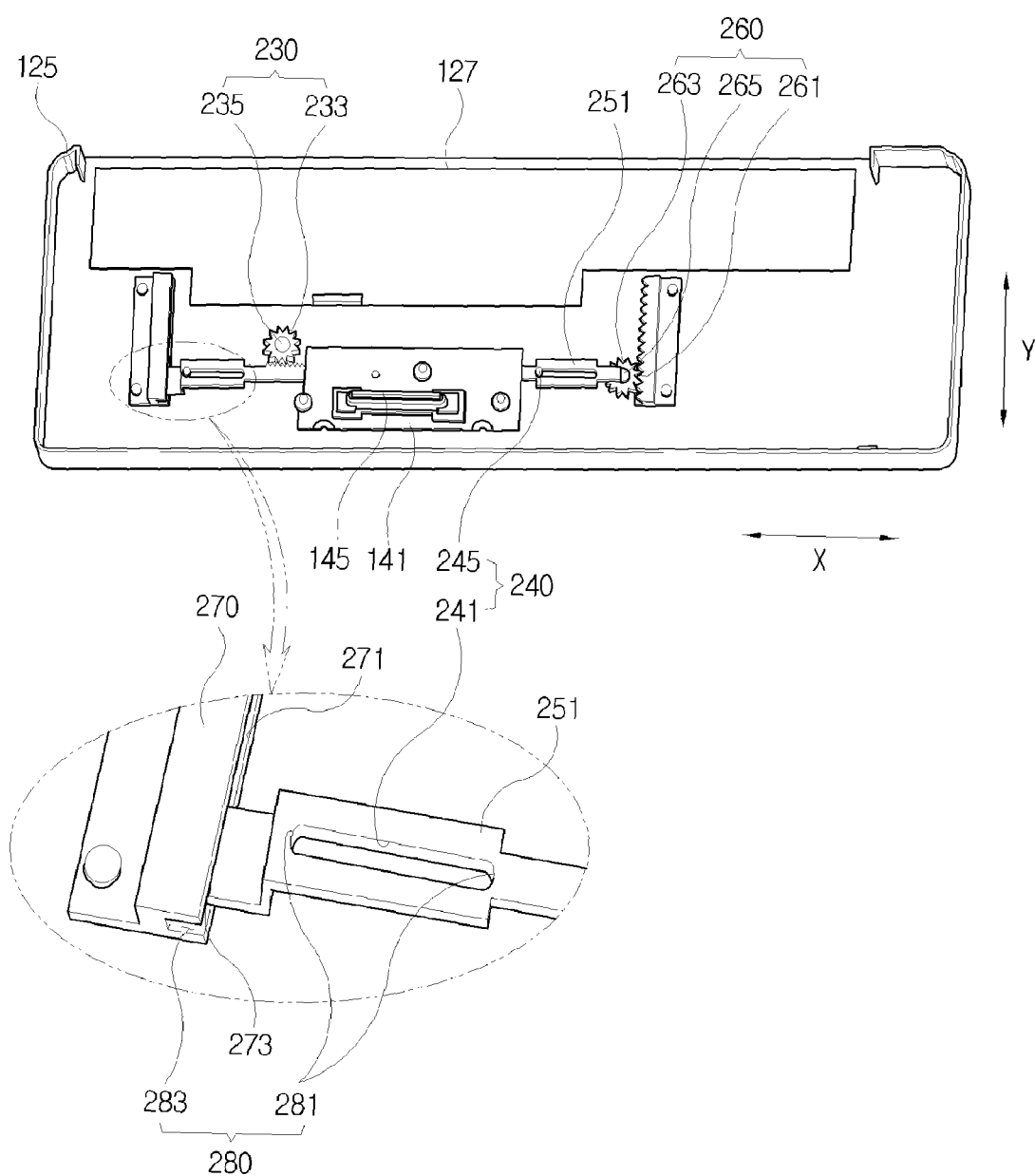
FIG. 3 is an 180 degree rotated perspective view illustrating a main part viewed from a front in FIG. 2.
Figure 4A:
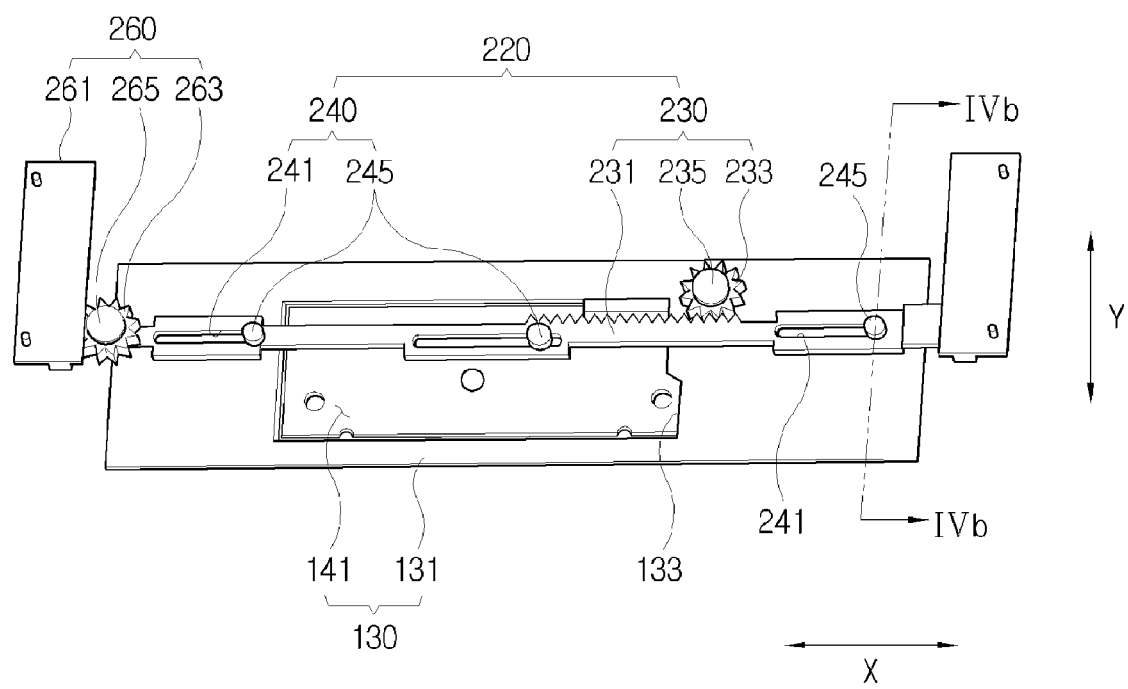
FIG. 4A is a perspective view illustrating a main part viewed from a rear in FIG. 2.
Figure 4B:
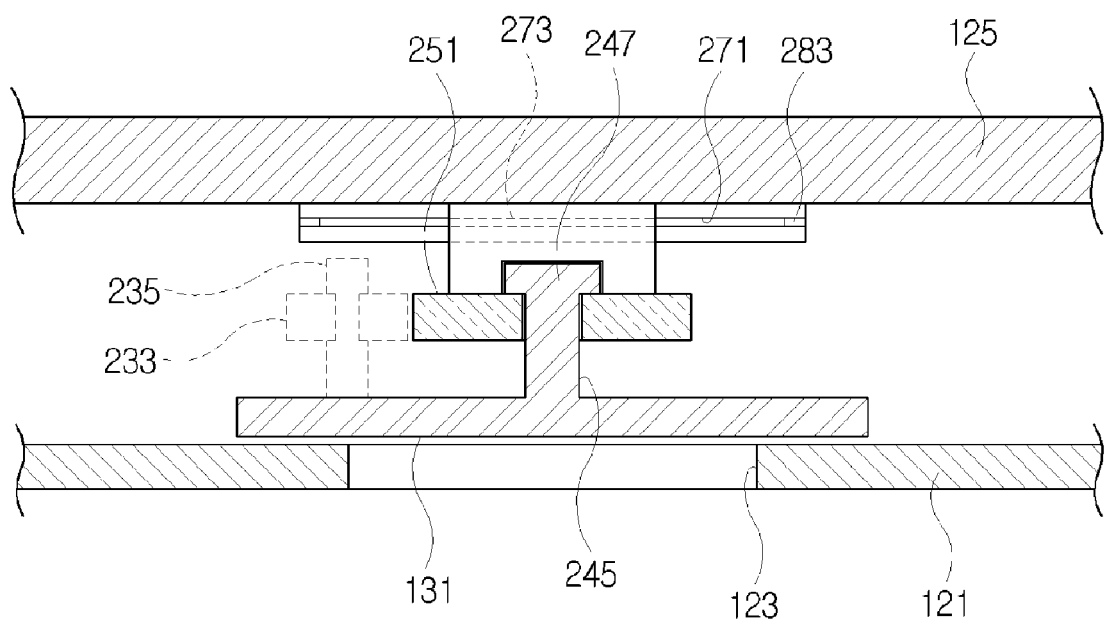
FIG. 4B is a sectional view taken along line 4B-4B in FIG. 4A.

Here, the transverse guiding slot 241 and the transverse guiding protrusion are provided in plural to stably guide and move the docking bracket 130 in the transverse direction. That is, as illustrated in FIGS. 3 and 4, three transverse guiding protrusions 245 are provided in this example. One transverse guiding protrusion 245 may be provided to the docking part 141, and two transverse guiding protrusions 245 may be provided to the bracket main body 131.

The transverse guiding protrusion 245 may include a stopper 247 (see FIG. 4B) provided to an end part thereof to prevent the perpendicular moving member 251 from being separated from the docking bracket 130.

Accordingly, the docking bracket 130 can simply and stably move with respect to the docking main body 120 in the transverse direction by means of the transverse moving part.

The perpendicular moving part is coupled with the transverse moving part and the docking main body 120 to move the docking bracket 130 with respect to the docking main body 120 in the perpendicular direction. The perpendicular moving part includes the perpendicular moving member 251, a perpendicular transmitting member 260 and a perpendicular guiding member 270.

Alternatively, the perpendicular moving part may be coupled in a fixed positional relationship with the docking bracket 130.

The perpendicular moving member 251 is provided between the docking main body 120 and the docking bracket 130 to be coupled with the docking bracket 130 by stopper 247 of the transverse guiding protrusion 245. The perpendicular moving member 251 has an elongated shape, and a perpendicular rack 261 is coupled to the opposite end parts thereof. The perpendicular moving member 251 may have various shapes as desired. A plurality of transverse guiding slots 241 are provided in a central portion of the perpendicular moving member 251. The plurality of transverse guiding slots 241 stably guide the docking bracket 130 in the transverse direction.

The perpendicular transmitting member 260 transmits a force, which moves the docking bracket 130 with respect to the docking main body 120. The perpendicular transmitting member 260 includes the perpendicular rack 261 and a perpendicular pinion 263 with a perpendicular pinion pivot 265.

The perpendicular rack 261 is mechanically coupled to the perpendicular moving member 251. Alternatively, the perpendicular pinion 263 may be coupled with a fixed positional relationship to the docking main body 120. In this alternative, the perpendicular rack 261 may be coupled with a fixed positional relationship to the perpendicular moving member 251.

The perpendicular pinion 263 is coupled to the perpendicular moving member 251 to be rotated about a perpendicular pinion pivot 265.

The perpendicular guiding member 270 via the perpendicular moving member 251, guides the docking bracket 130 in the perpendicular direction relative to the docking main body 120. The perpendicular guiding member 270 includes a perpendicular guiding protrusion 273 integrally formed with the perpendicular moving member 251, and a perpendicular guiding slot 271, coupled in a fixed positional relationship to a surface of the docking main body 120, to accommodate the perpendicular guiding protrusion 273 to slidably guide the perpendicular guiding protrusion 273.

Alternatively, the perpendicular guiding protrusion 273 may be coupled in a fixed positional relationship to the docking main body 120, and the perpendicular guiding slot 271 may be provided integrally formed with the perpendicular moving member 251.

A perpendicular moving restricting member 283 may be coupled to upper and lower end parts of the perpendicular guiding slot 271 to restrict movement of the perpendicular moving member 251 by restricting movement of the perpendicular guiding protrusion 273 in the perpendicular guiding slot 271.

Accordingly, if a user presses the docking bracket 130 in the perpendicular direction, the pressing force can be transmitted to the docking main body 120, and the docking bracket 130 can move in the perpendicular direction.

Here, the transverse transmitting member and the perpendicular transmitting member 260 may partially perform guiding of the docking bracket 130 with respect to the docking main body 120 as well as transmit the force moving the docking bracket 130 with respect to the docking main body 120. Also, the transverse transmitting member and the perpendicular transmitting member 260 may employ various known configurations instead of the rack and pinion configuration according to this exemplary embodiment.

Accordingly, the docking bracket 130 can conveniently move with respect to the docking main body 120 by means of the perpendicular moving part.

A moving restricting part 280 restricts a relative movement of the docking bracket 130 when the docking bracket 130 moves relative to the docking main body 120. The moving restricting part 280 includes a transverse moving restricting member 281 and the perpendicular moving restricting member 283.

The transverse moving restricting member 281 is provided at the opposite end parts of the transverse guiding slot 241 of the perpendicular moving member 251. Accordingly, the docking bracket 120 can move in the transverse direction by the length of the transverse guiding slot 241. The transverse moving restricting member 281 may employ various known configuration restricting a transverse movement of the docking bracket 130.

The perpendicular moving restricting member 283 may be formed integral with the perpendicular guiding member 270 so that the docking bracket 130 can not move past certain points in the perpendicular direction. The perpendicular moving restricting member 283 is formed to block the opposite end parts of the perpendicular guiding slot 271. Alternatively, perpendicular moving restricting member 283 may comprise various configurations provided to an end part of the perpendicular rack 261 of the perpendicular transmitting member 260 so that the perpendicular pinion 263 can not move past certain positions along the perpendicular rack 261.

Also, a position maintaining structure may be provided to maintain the docking bracket 130 at a position after the docking bracket 130 moves with respect to the docking main body 120. For example, a magnet may be disposed to a predetermined part of the docking bracket 130 to generate a predetermined magnetic force between the front cover 121 and the docking bracket 130, among other various known configurations which may be employed.

Figure 5A:
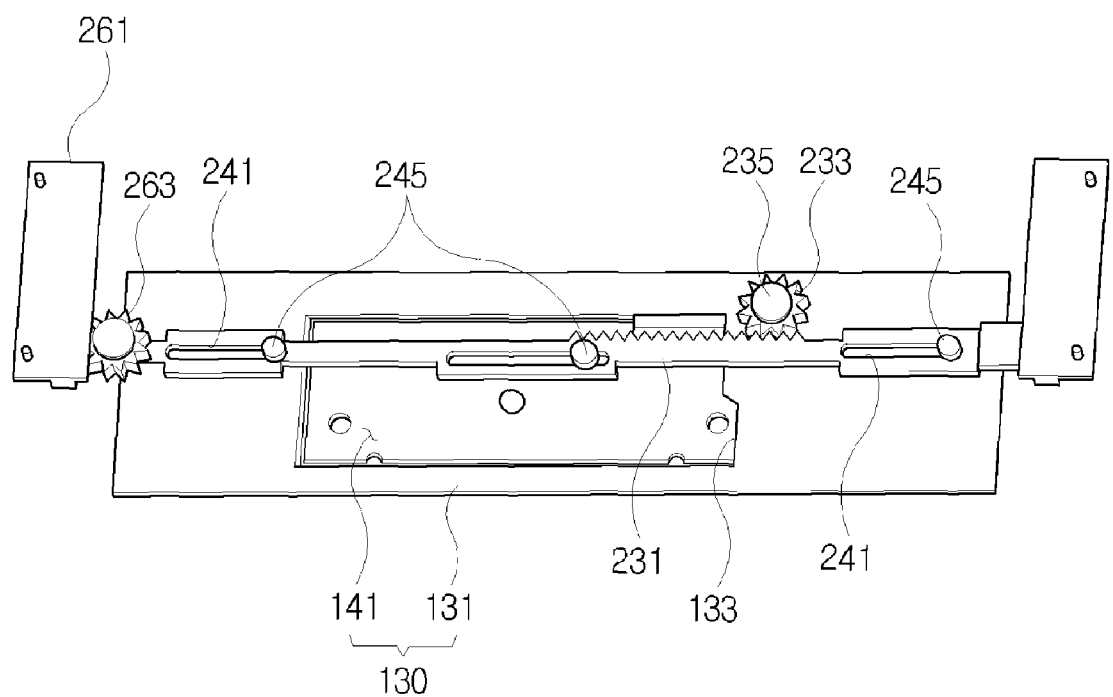
FIGS. 5A and 5B are perspective views illustrating an operating process of a transverse moving part in FIG. 2.
Figure 5B:
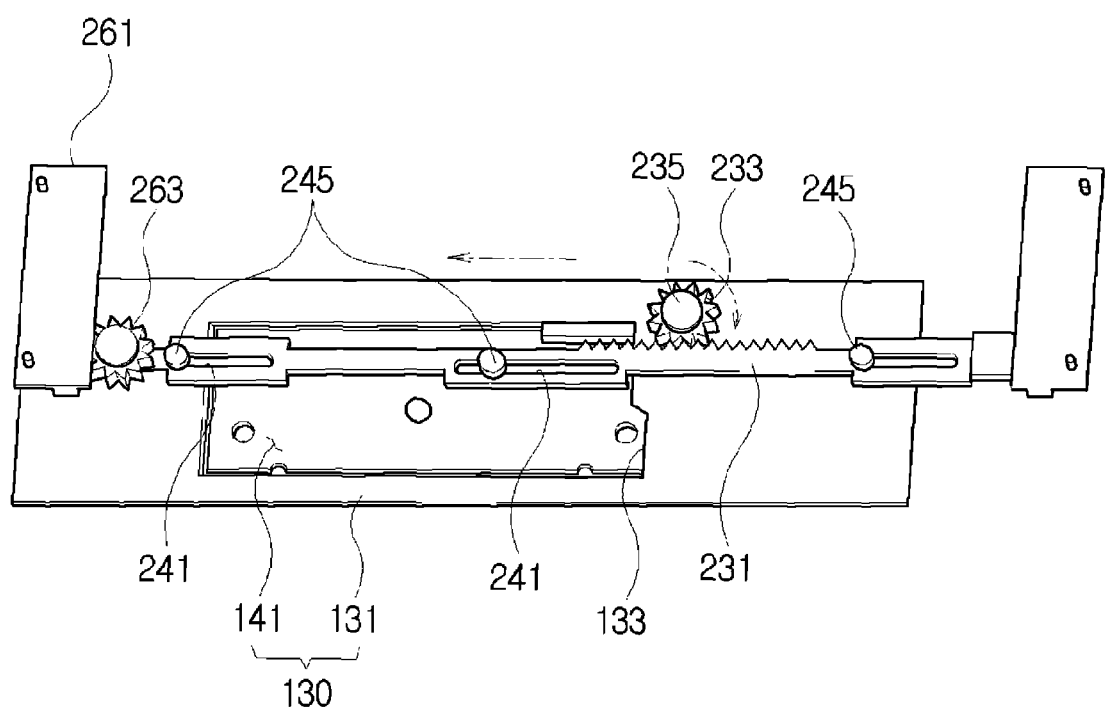

Hereinafter, an example of an operating process of the portable computer 100 is described with reference to FIGS. 5A to 6B. FIGS. 5A and 5B are figures illustrating the position moving unit 210 coupled to a rear surface of the front cover 121 viewed from a rear side of the front cover 121.

At first, the positions of the main body connector 105 and the docking connector 145 are schematically confirmed before the computer main body 101 is mounted to the docking system 110.

Then, a user moves the docking bracket 130 to be from a first state as illustrated in FIG. 5A to a second state as illustrated in FIG. 5B. As illustrated in FIG. 5A, if the user presses the docking bracket 130 from left to right in FIG. 5A, i.e., in the transverse direction along axis 'X', the perpendicular moving member 251 is stationary with respect to the docking main body 120, the transverse pinion 233 coupled to the docking bracket 130 rotates by the press of the user, and the transverse guiding protrusion 245 is guided in the transverse direction by the transverse guiding slot 241 so that the docking bracket 130 can move as illustrated in FIG. 5B. Here, the transverse direction movement of the docking bracket 130 is restricted by the transverse moving restricting member 281. That is, in this example, the docking bracket 130 is capable of moving in the transverse direction only by the length of the transverse guiding slot 241.

Figure 6A:
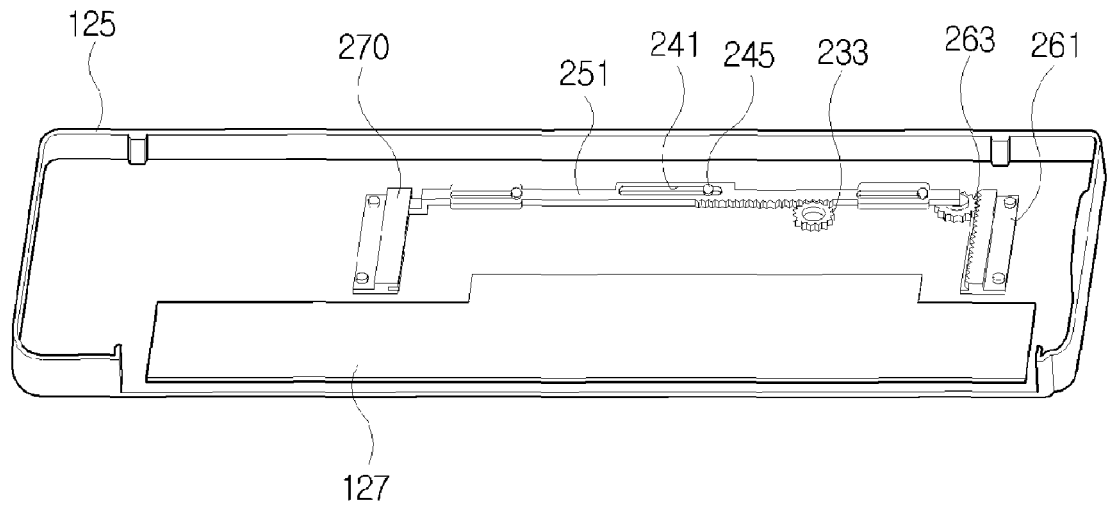
FIGS. 6A and 6B are perspective views illustrating an operating process of a perpendicular moving part in FIG. 2.
Figure 6B:
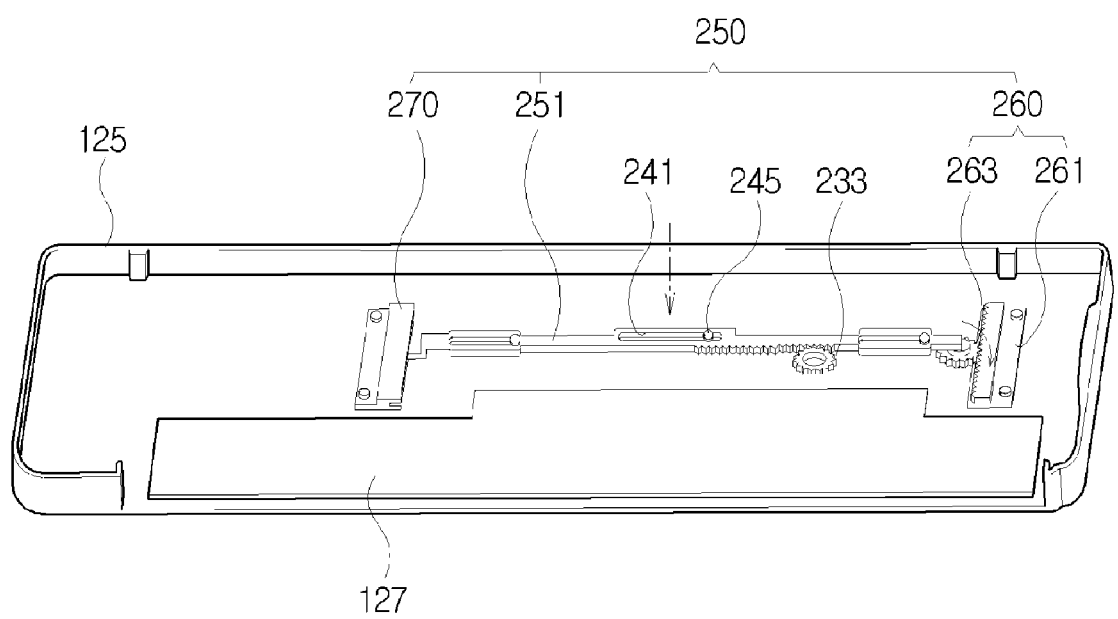
Figure 7:
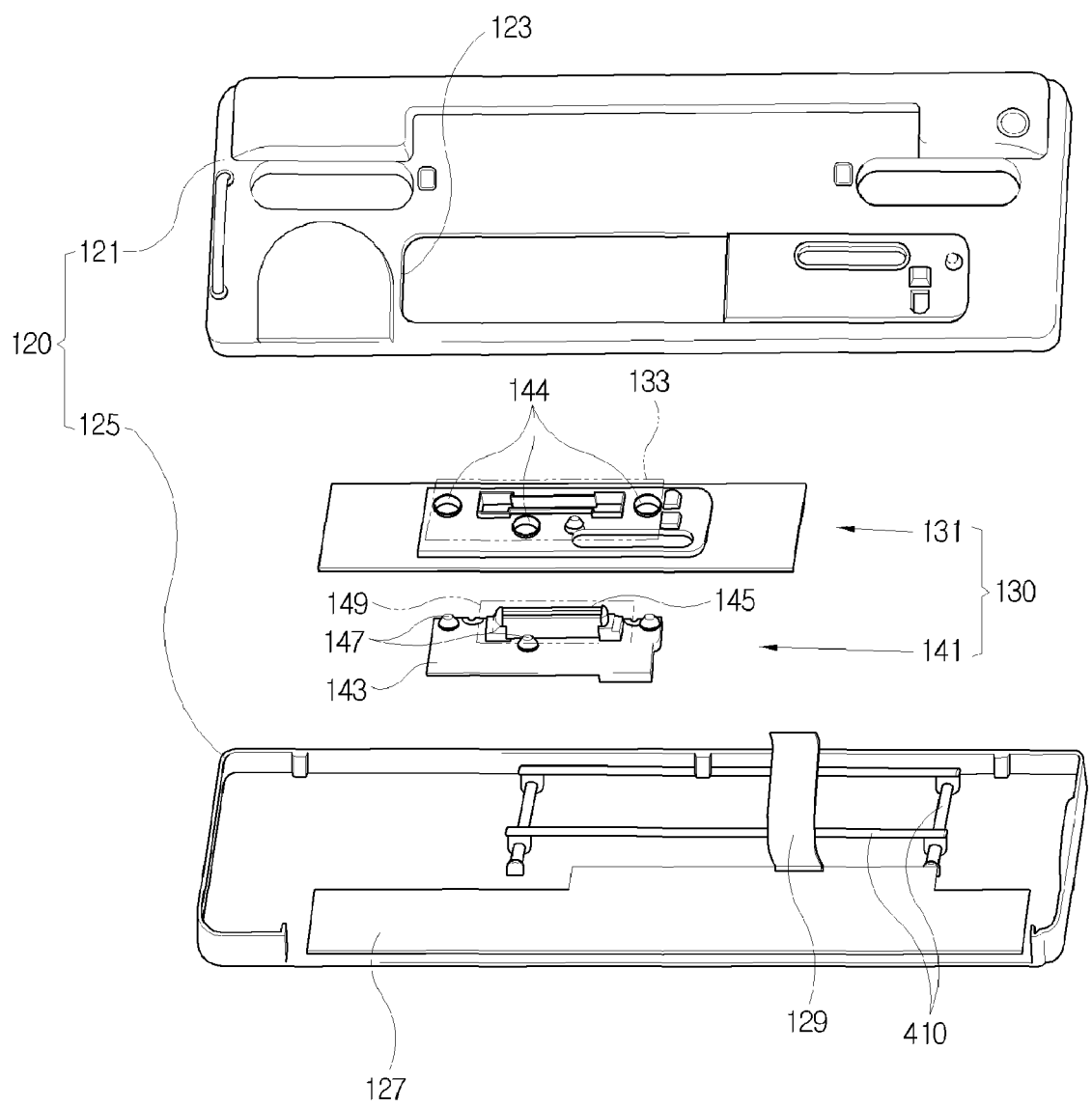
FIG. 7 is an exploded perspective view of a docking unit according to another exemplary embodiment.
Figure 8:
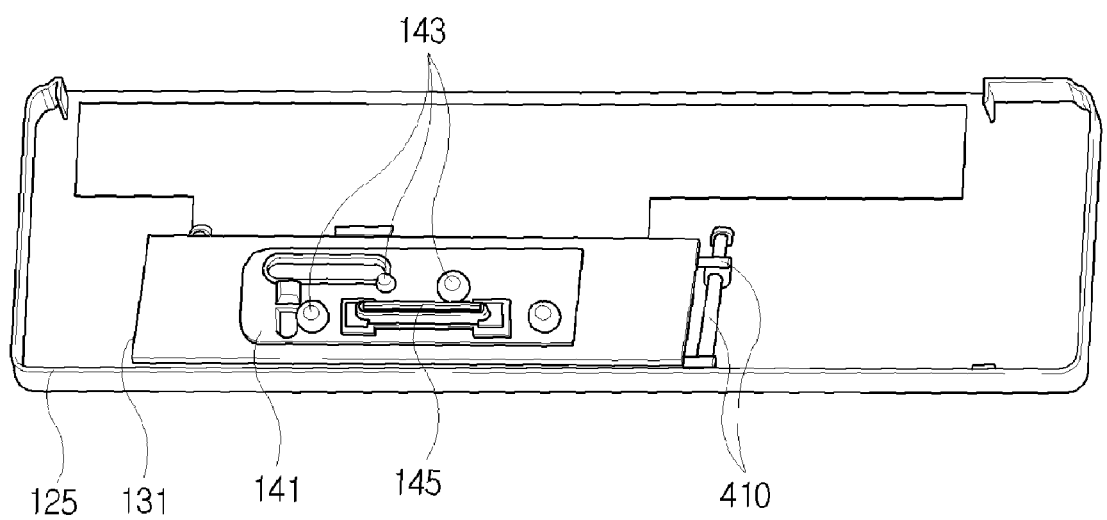
FIG. 8 is a perspective view illustrating a main part viewed from a front in FIG. 7.

Also, if the user presses the docking bracket 130 from up to down in FIG. 6A, i.e., in the perpendicular direction along axis 'Y', the perpendicular moving member 251 moves with respect to the main docking body 120 from a first state as illustrated in FIG. 6A to a second state as illustrated in FIG. 6B. Specifically, the perpendicular pinion 263 coupled to an end part of the perpendicular moving member 251 is engaged with the perpendicular rack 261 so that the docking bracket 130 can move by the pressing force of the user pressing the docking bracket 130 with respect to the docking main body 120 in the perpendicular direction. Here, the perpendicular guiding protrusion 273 may be guided by the perpendicular guiding slot 271. Accordingly, the docking bracket 130 can be conveniently moved to a position desired by the user. The perpendicular direction movement of the docking bracket 130 is restricted by the perpendicular moving restricting member 283 coupled to the perpendicular guiding slot 271.

Accordingly, the user can simply couple the main body connector 105 and the docking connector 145 allowing power and/or information to be supplied between the outside world to the computer main body 101 through the docking driving part 127, the flexible substrate 129, the sub substrate 149 and the docking connector 145 of the docking system 110. Also, any EMI between the computer main body 101 and the docking system 110 can be reduced or prevented from being generated, and noises can be reduced by the EMI coupling member 147.

As described above, the transverse direction movement and the perpendicular direction movement of the docking bracket 130 are separately described. However, the docking bracket 130 may concurrently move in the transverse direction and the perpendicular direction.

Accordingly, the computer main body and the docking system can be conveniently coupled and detached. Furthermore, the docking system may be conveniently coupled and detached to various types of computer main bodies which may include main body connectors located at various positions relative to the computer main body. Also, design restrictions with respect to the position of the main body connector relative to the computer main body can be relieved, and standardization of the docking system can be simply accomplished.

As illustrated in FIGS. 7 to 11, a portable computer 100 according to another exemplary embodiment includes a computer main body described above with respect to the previous exemplary embodiment (not shown in FIGS. 7-11), and a docking system 410 including a docking main body 120, a docking bracket 130 and a position moving unit 210. The docking system 410 includes a transverse moving part 420 including a transverse guiding bar 440 and a transverse guiding holder 430, and a perpendicular moving part 450 including a perpendicular guiding bar 470 and a perpendicular guiding holder 480.

The transverse guiding bar 440 is coupled to the perpendicular guiding bar 470 by the perpendicular guiding holder 480 to guide the docking bracket 130 in a transverse direction. Here, the transverse guiding bar 440 has a long circular shape. However, the transverse guiding bar 440 may have other shapes, such as a hexagonal shape, other polygonal shapes, etc. The perpendicular guiding holder 480 is formed to the opposite end parts of the transverse guiding bar 440. The transverse guiding bars 440 are movably coupled to upper and lower sides of the docking bracket 130 side by side in the perpendicular direction by the transverse guiding holders 430. Here the transverse guiding holders 430 are directly attached to docket bracket 130.

The transverse guiding holder 430 is engaged with the transverse guiding bar 440. A central portion of the transverse guiding holder 430 has a shape inverse to a sectional shape of the transverse guiding bar 440. The transverse guiding holder 430 has a cut out area in a 'C' shape. Preferably, the transverse guiding holder 430 has an elastic force to allow coupling and detachment without difficulty.

The positioning of the transverse guiding holders 430 determine a transverse direction moving distance of the docking bracket 130. Specifically, the transverse direction movement of the docking bracket 130 is restricted by the perpendicular guiding holder 480 abutment against the transverse guiding holder 430.

The perpendicular guiding bar 470 is coupled via perpendicular moving restricting members 483 in a fixed positional relationship to the docking main body 120 to guide a perpendicular direction movement of the docking bracket 130. The perpendicular guiding bar 470 has a long circular shape. Alternatively, the perpendicular guiding bar 470 may have other shapes such as a hexagonal shape, other polygonal shapes, etc. The perpendicular guiding bar 470 is coupled to right and left sides of the docking main body 120. The perpendicular moving restricting members 483 also act to limit the distance the docking bracket 130 may move in the perpendicular direction.

The perpendicular guiding holder 480 is engaged to the perpendicular guiding bar 470. A central portion of the perpendicular guiding holder 480 has an inverse shape which is the same as a sectional shape of the perpendicular guiding bar 470. The perpendicular guiding holder 480 has a cut out area to have an elastic force, thereby allowing coupling, etc. without difficulty. The perpendicular guiding holders 480 are formed at the opposite end parts of the pair of transverse guiding bars 440.

As will be apparent, rather than directly attach the transverse guiding holders 430 to the docking bracket 130, the transverse guiding bars 440 may be directly attached to the docking bracket 130. In this alternative, the traverse guiding holders 430 may be fixed to the perpendicular guiding bars 470. The perpendicular guiding bars 470 in this alternative may be indirectly attached to the docking main body 120, engaged with perpendicular guiding holders which in turn are directly attached to the docking main body 120.

Hereinafter, an example of an operating process of the portable computer (not shown) according to this exemplary embodiment will be described by referring to FIGS. 9 to 11.

At first, the positions of the main body connector 105 and the docking connector 145 are schematically confirmed before the computer main body 101 is mounted to the docking system 410.

Figure 9:
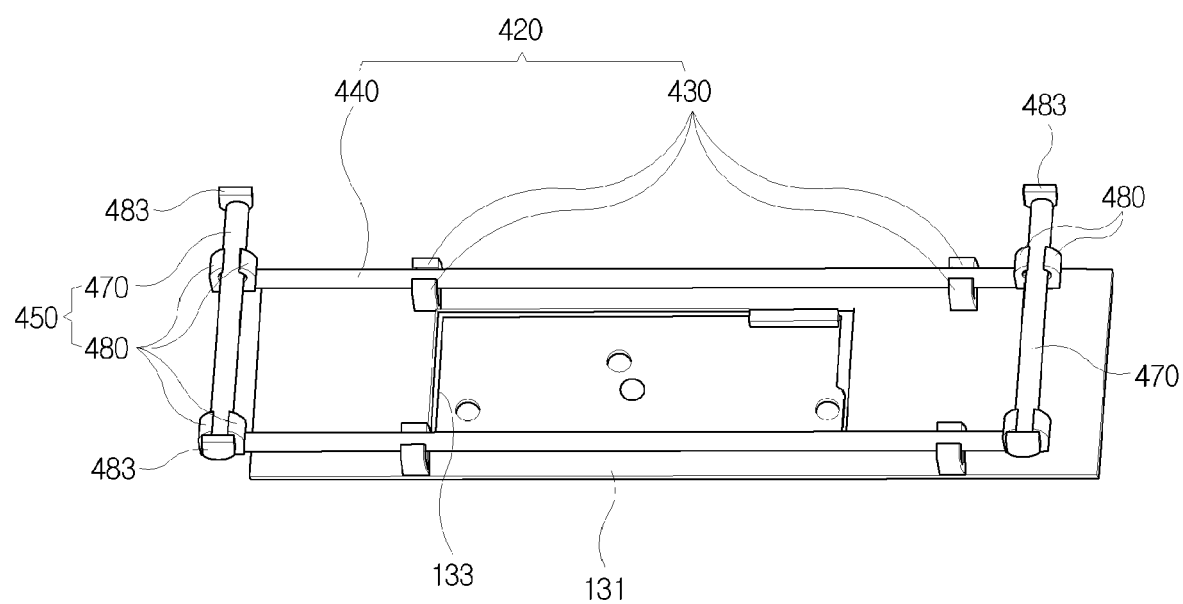
FIGS. 9 to 11 are perspective views illustrating an operating process of FIG. 7
Figure 10:
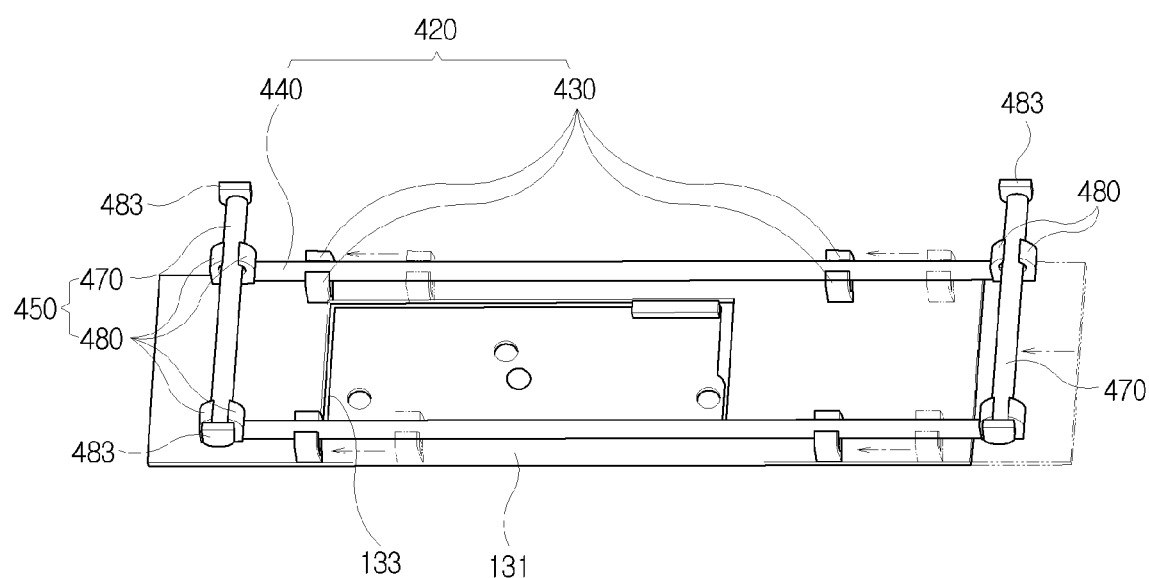

Then, as illustrated in FIGS. 9 and 10, a user moves the docking bracket 130 in the transverse direction. If the user presses the docking bracket 130 from left to right in FIG. 9, in the transverse direction along axis 'X', the transverse guiding bar 440 is stationary with respect to the docking main body 120, the transverse guiding holder 430 coupled to the docking bracket 130 is moved along the transverse guiding bar 440 by the press of the user (refer to FIG. 10). Accordingly, the docking connector 145 can be conveniently moved in the transverse direction.

Here, if the transverse guiding holder 430 abuts the perpendicular guiding holder 480 formed to the opposite end parts of the transverse guiding bar 440, the transverse direction movement of the docking connector 145 stops.

Figure 11:
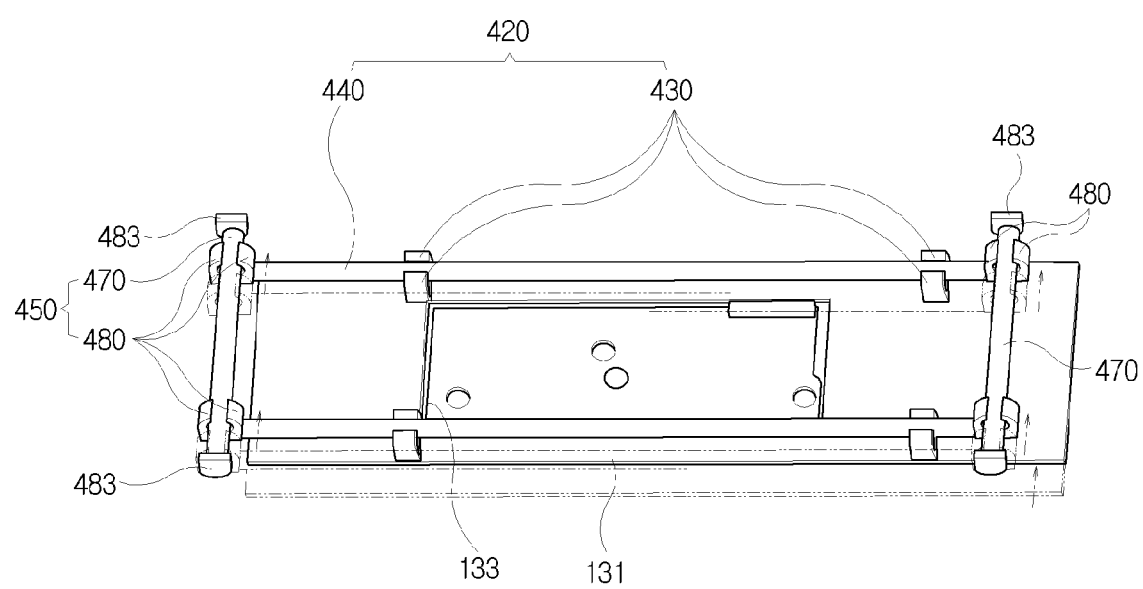

Also, as illustrated in FIGS. 9 and 11, if the user presses the docking bracket 130 from down to up in FIG. 9, in the perpendicular direction along axis 'Y', the transverse guiding bar 440 moves with respect to the docking main body 120. That is, the perpendicular guiding holder 480 is guided by the perpendicular guiding bar 470 to guide the docking bracket 130 in the perpendicular direction by the pressing force of the user pressing the docking bracket 130 with respect to the docking main body 120 in the perpendicular direction. Accordingly, the docking bracket 130 can be conveniently moved to a position desired by the user.

Here, the perpendicular direction movement of the docking bracket 130 is restricted by the perpendicular moving restricting members 483 coupled to ends the perpendicular guiding bars 470.

Accordingly, this exemplary embodiment obtains the same effect as the previous exemplary embodiment with the configuration simpler than that of the previous exemplary embodiment of the present general inventive concept.

Thus, a docking system may be capable of convenient alteration to correspond various types of computer main bodies.

Also, a restriction in design with respect to the position of a main body connector of a computer main body can be relaxed.

Also, standardization of a docking system can be easily accomplished.

Although a few exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents. As used in this disclosure, the term "preferably" is non-exclusive and means "preferably, but not limited to." Terms in the claims should be given their broadest interpretation consistent with the general inventive concept as set forth in this description. For example, the terms "coupled" and "connect" (and derivations thereof) are used to connote both direct and indirect connections/couplings. As another example, "having" and "including", derivatives thereof and similar transition terms or phrases are used synonymously with "comprising" (i.e., all are considered "open ended" terms)—only the phrases "consisting of" and "consisting essentially of" should be considered as "close ended". Claims are not intended to be interpreted under 112 sixth paragraph unless the phrase "means for" and an associated function appear in a claim and the claim fails to recite sufficient structure to perform such function.

What is claimed is:

1. A docking system to be detachably coupled with a computer main body, comprising:

a docking main body which is formed with a docking opening;

a docking bracket which comprises a docking part positioned about the docking opening to be electrically connected with the computer main body; and a position moving unit which movably couples the docking bracket to the docking main body to move the docking bracket in a direction substantially parallel to a surface of the docking main body having the docking opening;

wherein the position moving unit comprises a transverse moving part which is coupled to one of the docking main body and the docking bracket to move the docking bracket in a transverse direction with respect to the surface of the docking main body.

2. The docking system according to claim 1, wherein the position moving unit further comprises a perpendicular moving part which is coupled to the transverse moving part to move the docking bracket in a perpendicular direction different from the transverse direction with respect to the surface of the docking main body.

3. The docking system according to claim 2, wherein the transverse direction and the perpendicular direction are substantially perpendicular each other.

4. The docking system according to claim 2, wherein the transverse moving part comprises at least one of a transverse transmitting member which transmits a force to move the transverse moving part with respect to the docking main body, and a transverse guiding member which guides the transverse moving part with respect to the docking main body.

5. The docking system according to claim 4, wherein the transverse transmitting member comprises:

a transverse rack which is provided to one of the docking bracket and the perpendicular moving part, and a transverse pinion which is provided to the other of the docking bracket and the perpendicular moving part engaged with the transverse rack.

6. The docking system according to claim 4, wherein the transverse guiding member comprises:

a transverse guiding slot which is provided to one of the docking bracket and the perpendicular moving part, and a transverse guiding protrusion which is provided to the other of the docking bracket and the perpendicular moving part engaged with the transverse guiding slot.

7. The docking system according to claim 2, wherein the perpendicular moving part comprises a perpendicular moving member which is interposed between the docking main body and the docking bracket coupled with the transverse moving part.

8. The docking system according to claim 7, wherein the perpendicular moving part further comprises at least one of a perpendicular transmitting member which transmits a force to move the docking bracket with respect to the docking main body, and a perpendicular guiding member which guides the docking bracket with respect to the transverse moving part.

9. The docking system according to claim 8, wherein the perpendicular transmitting member comprises:

a perpendicular rack which is provided to one of the docking main body and the perpendicular moving part, and a perpendicular pinion which is provided to the other of the docking main body and the perpendicular moving part engaged with the perpendicular rack.

10. The docking system according to claim 8, wherein the perpendicular guiding member comprises:

a perpendicular guiding slot which is provided to one of the docking main body and the perpendicular moving part, and a perpendicular guiding protrusion which is provided to the other of the docking main body and the perpendicular moving part engaged with the perpendicular guiding slot.

11. The docking system according to claim 1, wherein the position moving unit further comprises a moving restricting part which restricts an amount of movement of the docking bracket relative to the docking main body.

12. The docking system according to claim 2, wherein the transverse moving part comprises:
    a transverse guiding bar which is coupled to one of the docking bracket and the perpendicular moving part, and
    a transverse guiding holder which is coupled to the other of the docking bracket and the perpendicular moving part engaged with the transverse guiding bar.

13. The docking system according to claim 2, wherein the perpendicular moving part comprises:
    a perpendicular guiding bar which is provided to one of the docking main body and the transverse moving part, and
    a perpendicular guiding holder which is provided to the other of the docking main body and the transverse moving part coupled with the perpendicular guiding bar.

14. A portable computer, comprising:
    a computer main body; and
    a docking system which is detachably coupled with the computer main body,
    the docking system comprising a docking main body which is formed with a docking opening, a docking bracket which comprises a docking part which is accommodated to the docking opening to be electrically connected with the computer main body, and a position moving unit which movably couples the docking main body and the docking bracket to guide the docking bracket in a direction substantially parallel to a surface of the docking main body having the docketing opening;
    wherein the position moving unit comprises a transverse moving part which is coupled to one of the docking main body and the docking bracket to move the docking bracket in a transverse direction with respect to the docking main body.

15. The portable computer according to claim 14, wherein the position moving unit further comprises a perpendicular moving part which is coupled to the transverse moving part to move the docking bracket in a perpendicular direction, different from the transverse direction, with respect to the docking main body.

16. The portable computer according to claim 15, wherein the transverse direction and the perpendicular direction are substantially perpendicular each other.

17. A docking station to couple with a portable computer, comprising:
    a main housing having an opening therein;
    a plate positioned to cover the opening;
    an electrical connector mounted on the plate to have a fixed positional relationship with the plate; and
    a physical connector to movably connect the plate to the main housing;
    wherein the position of the electrical connector relative to the main housing is adjustable in a direction substantially parallel to a surface of the main housing having the opening.

18. The docking station of claim 17, wherein the physical connector includes a pin coupled with a fixed positional relationship to one of the plate and the main housing, fitted within a slot of a structure having a fixed positional relationship to the other of the plate and the main housing.

19. The docking station of claim 18, wherein the structure is a second plate connected with a fixed positional relationship to the main housing.

20. The docking station of claim 18, wherein the structure is a second plate connected with a fixed positional relationship to the plate to which the electrical connector is mounted.

21. The docking station of claim 17, wherein the physical connector includes a clasp movably fitted to a bar, the clasp being connected in a fixed positional relationship to one of the plate and the main housing and the bar being connected in a fixed positional relationship to the other of the plate and the main housing.

22. A docking system to be detachable coupled with a computer main body, comprising:
    an adjustable docking bracket that is movable in a direction substantially orthogonal to a connecting direction of the computer main body and transverse to the computer main body.

* * * * *